(12) United States Patent  
Sapuppo

(10) Patent No.: US 8,079,258 B1
(45) Date of Patent: Dec. 20, 2011

(54) GYROSCOPE AND PENDULOUS GYROSCOPIC ACCELEROMETER WITH ADJUSTABLE SCALE FACTOR, AND GRAVITY GRADIOMETER USING SUCH

(75) Inventor: Michele S. Sapuppo, Andover, MA (US)

(73) Assignee: Milli Sensor Systems & Actuators, West Newton, MA (US)

( * ) Notice: Subject to any disclaimer, the term of this patent is extended or adjusted under 35 U.S.C. 154(b) by 590 days.

(21) Appl. No.: 12/210,331

(22) Filed: Sep. 15, 2008

Related U.S. Application Data

(60) Provisional application No. 60/972,293, filed on Sep. 14, 2007.

(51) Int. Cl.
*G01C 19/02* (2006.01)
*G01P 9/02* (2006.01)

(52) U.S. Cl. .................. 73/504.02; 73/504.09

(58) Field of Classification Search .......... 73/504.03, 73/504.02, 504.09, 504.11, 504.08, 382 G
See application file for complete search history.

(56) References Cited

U.S. PATENT DOCUMENTS

| 4,445,375 A * | 5/1984 | Wells ........................ 73/504.09 |
| 4,510,802 A * | 4/1985 | Peters ........................ 73/504.12 |
| 4,581,932 A | 4/1986 | Lautzenhiser et al. |
| 4,807,138 A * | 2/1989 | Krogmann .................... 701/220 |
| 4,955,232 A | 9/1990 | Lautzenhiser et al. |
| 5,357,802 A * | 10/1994 | Hofmeyer et al. .......... 73/382 G |
| 5,457,993 A | 10/1995 | Sapuppo |
| 5,691,470 A * | 11/1997 | Sapuppo et al. ........... 73/504.02 |
| 5,712,426 A * | 1/1998 | Sapuppo et al. ........... 73/504.03 |
| 5,728,935 A * | 3/1998 | Czompo ..................... 73/382 G |
| 5,922,951 A | 7/1999 | O'Keefe et al. |
| 6,799,459 B2 * | 10/2004 | Dosch et al. ................ 73/382 G |
| 7,181,967 B2 * | 2/2007 | Lee ............................ 73/382 G |
| 7,472,596 B1 * | 1/2009 | Cardarelli .................. 73/514.15 |
| 7,509,857 B2 * | 3/2009 | Shirasaka et al. .......... 73/504.03 |
| 7,549,334 B2 * | 6/2009 | Cardarelli .................. 73/504.13 |
| 7,726,188 B2 * | 6/2010 | Cardarelli .................. 73/504.13 |

OTHER PUBLICATIONS

Oshika, E.M. and Parziale, A.J.; Redundant Carousel Strapdown Guidance System; IEEE Plans 76, pp. 106-115.
Parmentola, John; The Gravity Gradiomemter as a Verification Tool; Science & Global Security, 1990, vol. 2, pp. 43-57; 1990 Gordon & Breach Science Publishers, S.A.
Johnson, Donald O.; Instrumenting the Floated Gravity Gradiometer; Oct. 1979; The Charles Stark Draper Laboratory, Inc., Cambridge, Massachusetts.

* cited by examiner

*Primary Examiner* — Helen C. Kwok
(74) *Attorney, Agent, or Firm* — Brian M. Dingman; Mirick, O'Connell, DeMallie & Lougee, LLP

(57) ABSTRACT

Gyroscopes and pendulous gyroscopic accelerometers with adjustable scale factor are accomplished through control of the net angular momentum of a gyroscopic element such as a rotating or oscillating wheel or other mass. The sensitivity of a gravity gradiometer can be enhanced through use of such instruments, allowing the development of man-portable gravity gradiometers.

12 Claims, 6 Drawing Sheets

GYROSCOPE AND PENDULOUS GYROSCOPIC ACCELEROMETER WITH ADJUSTABLE SCALE FACTOR, AND GRAVITY GRADIOMETER USING SUCH

CROSS REFERENCE TO RELATED APPLICATION

This application claims priority of provisional application Ser. No. 60/972,293, filed on Sep. 14, 2007. The entirety of this prior application is incorporated herein by reference.

FIELD OF THE INVENTION

This invention relates to a gyroscope and pendulous gyroscopic accelerometer with adjustable scale factor, and a gravity gradiometer using such.

BACKGROUND OF THE INVENTION

Measurements of gravity gradient are typically reported in units of eotvos, named after Prof. Lorand Eotvos, who made pioneering studies of the gradient of the earth's gravitational field. One eotvos is defined as a change in gravity of one tenth of a micro-g over a distance of one kilometer. That is, 1 eotvos=0.1 micro-g per kilometer=0.0001 micro-g per meter.

In the early 1970s, two methods were developed to measure gravity gradients. One method consists of a metallic sphere with high-density weights located at opposite ends of a diameter. The sensing sphere or floated torque-summing member is symmetric about this diameter. The sphere is suspended within the surrounding hollow sphere by a fluid, augmented by electrostatic suspension, such that the sensing sphere is free to rotate inside the surrounding sphere. When a given mass is passed by the device at an angle that is not perpendicular to the weighted diameter, the mass pulls more on the nearer weight than on the further. A torque is thereby exerted on the sensing sphere. The device includes a system that exerts a counter torque just sufficient to keep the sphere at a null position; the amount of counter torque is determined by a feedback system that is calibrated to a source of electric current. Because the moments of inertia of the sensing sphere are precisely known and the counter torque is measured, the components of the gradient of the gravitational field can be determined. This type of gravity gradiometer design was successfully built and tested. A typical response time of 1 minute for a signal of approximately 14 eotvos units was demonstrated with 0.25 eotvos accuracy through a measurement of gravity gradient produced by an 8.75 pound (4 kilogram) lead ball. A complete system of 3 gradiometers with gimbals, electronics, computers and power supply was estimated to be 230 kilograms in weight and projected to have an accuracy of 1 eotvos unit with a response time as short as 10 seconds. However, this proposed system was never built.

A second method employs pairs of diametrically opposed accelerometers mounted on a rotating table. The difference in quantities measured by the two opposing accelerometers is a measure of a component of gravity gradient in the plane of the disc. The difference signal between the two accelerometers is demodulated at twice the frequency of the rotation of the disc, yielding the required gravity gradient. This gravity gradiometer system, with improvements, represents the current state of the art. This system mechanization is referred to as "carouselling" and was initially used successfully for aircraft navigation systems.

Gravity gradiometers which incorporate multiple rotating accelerometers as their prime sensors use accelerometers which are based on torque-to-balance scientific principles but do not include a gyroscopic element. Fundamentally, these devices use a calibrated restraint to balance a pendulum. Their ultimate performance depends on the stability of a spring or the stability of the magnetic field of a torquer. Millions of dollars, spent over decades on materials and design refinements, have brought this torque-to-balance technology to its performance limit for this and similar applications. By rotating multiple torque-to-balance accelerometers, commercial systems are able to achieve the approximately two orders of magnitude performance improvement necessary to locate and discern minerals and hydrocarbon deposits. The performance is about 1 eotvos for static measurements on land, and about 5-7 eotvos for airborne measurements.

SUMMARY OF THE INVENTION

The pendulous gyroscopic accelerometer (PGA) depends on the balance of two inertial torques: a pendulous torque being balanced by a gyroscopic torque. The unbalance or pendulosity is made by offsetting the gyro wheel or by adding a pendulous mass along the axis of spin. The pendulous torque acting on the torque-summing member, caused by gravity or acceleration, is counterbalanced by gyroscopic precessional torque acting on the torque-summing member of the gyroscope in the opposing direction as a result of the rotation of the gyroscope about its input axis. The velocity of the rotation of the gyroscope is a direct indication of the acceleration being sensed. Instruments based on this principle have exhibited threshold sensitivity in the range of nano gravities. In one aspect, the invention contemplates the use of PGAs in a rotating-table gravity gradiometer system, to accomplish improved sensitivity and resolution of the gravity gradiometer system by a minimum of an order of magnitude.

A standard gyro with a rotating gyroscopic element, such as a wheel, may be made pendulous by placing an appropriate mass at a fixed distance from the input axis along the gyro's spin reference axis, as shown by pendulous gyro 10, FIG. 1. Gyro wheel 11 rotates about spin reference axis (SRA) 19, and is made pendulous through mass 16 that is offset from input axis (IA) 17 and located on SRA 19. Gimbal 21, which carries gyro wheel 11, is rigidly attached to torque-summing member (TSM) 20. Specific force input applied along the gyro's input axis 17 produces a pendulous torque about the output axis (OA) 18. This torque will produce a rotation of TSM 20 about the output axis; this is detected by the signal generator (SG) 14. Torque generator 13 is used to maintain TSM 20 at null during fabrication tests, and is used to produce controlled torque about the output axis 18. The output from SG 14 is used as the input to a servo driven member (SDM), not shown, that in response rotates TSM 20 about axis 17 to develop gyroscopic torque, which counterbalances the pendulous torque and returns the original offset signal from SG 14 to null.

The basic steady-state torque relationship of a torque-to-balance, pendulous gyroscopic accelerometer is:

$$H \times W(IA) = mla(IA)$$

where:
$H \times W(IA)$=gyroscopic torque generated by rotation
$mla(IA)$=pendulous torque generated by acceleration
$H$=angular momentum of gyroscope
$W(IA)$=rotational input to gyroscope
$m$=pendulous mass
$l$=offset of pendulous mass along SRA
$a(IA)$=acceleration along accelerometer input axis Scale factor (SF) is used to relate output to input in a measuring device. The scale factor of a pendulous gyroscopic accelerometer is defined as the ratio of rotational input to input acceleration:

$SF=ml/H$, typically expressed in units of rad/sec/g

A larger scale factor indicates more sensitivity and accuracy due to the larger output for a given input. In a PGA-type accelerometer, for example, the angular velocity output is related to an acceleration input by the scale factor. If the output is expressed in radians per second and the input in g's, the units of scale factor are: radians/second/g. For any given set of units, the larger the scale factor the better, that is, more sensitivity and accuracy can be obtained by having a larger output for a given input. This is especially important in a gravity gradiometer designed to detect a nearby mass, because the input is small. A scheme to enlarge the scale factor is thus extremely valuable.

In one aspect, this invention relates to the use of pendulous gyroscopic accelerometers as the prime sensing devices for gravity gradiometer systems. The invention also relates to two types of gravity gradiometer systems that employ PGAs: one type of system consists of multiple accelerometers in a carouselling mode, and the other type of system consists of multiple static aligned accelerometers.

Improvements in resolution and sensitivity to detect smaller masses at greater distances in shorter time frames, reduction in size, weight and power to enable portability, simpler construction with fewer components to lower cost, and performance growth potential based on technical innovations in the design of special accelerometers are some of the major benefits of the invention.

In part, this invention results from the realization that, by replacing torque-to-balance accelerometers with pendulous gyroscopic accelerometers in rotating accelerometer gravity gradiometer systems, the performance of the system should be enhanced by a minimum of one order of magnitude. This conclusion is based on existing data on strategic-quality pendulous gyroscopic accelerometers which show measurement residuals in the range of $1\times10e-9$ g, that is, 1 nano-g. These accelerometers were designed for severe and high acceleration environments. In contrast, gravity gradiometer systems operate in mild environments at earth gravity level, allowing the pendulous gyroscopic accelerometer design to be tailored to this application.

The invention also contemplates several design refinements which improve the basic stability of the PGA. These include: reduction of thermal gradients, adjustment of pendulosity, more precise temperature control, and higher gyrowheel-enclosure (torque-summing member) suspension stiffness. Hence, the opportunity to design an accelerometer specifically for gravity gradiometer systems based on PGA principles, with added technology improvements, holds substantial promise of achieving several orders of magnitude performance advantage over current system mechanizations that use torque-to-balance accelerometers.

In the inventive gravity gradiometer configured with PGA-type accelerometers, the output can be expressed as the difference between the angular velocities of two accelerometers in radians per second, and the input gravity gradient can be expressed in units of eotvos, yielding a scale factor in units of radian/second/eotvos. One embodiment of the inventive PGA uses counter-rotating wheels or other masses as the gyroscopic element of a PGA, and accomplishes an accelerometer with a scale factor that is enlarged by orders of magnitude. Further, this counter-rotating wheel design does not limit the choice of wheel bearing support, such as ball bearings, gas bearings, magnetic bearings, etc. A further significant advantage is that because the frequency differences are very small to produce the scale factor variations, wheel power remains essentially constant.

This invention results in an increase of the scale factor of the PGA anywhere from single-digit rad/sec/g to very high levels in the range of $1\times10e6$ rad/sec/g. The impetus for this feature is that the levels of inertial force to be sensed with a gravity gradiometer are very low, in the nano-g to pico-g range. The typical scale factor of 1 rad/sec/g of the PGA would require unacceptably long times to resolve the very low gravity input. Increasing the scale factor of the PGA is done by introducing a counter-rotating (CRW) design, which enables the PGA to have a very high scale factor that is adjustable over a wide range. An adjustable scale factor is accomplished by having an adjustable net angular momentum (H) of the CRW. The adjustable net H is accomplished by fine-tuning the wheel speed of one or both of the counter-rotating wheels.

In one embodiment, the speed of one wheel is constant, and the speed of the other wheel is carefully controlled by control of the frequency of the wheel voltage supplied to the hysteresis or permanent-magnet motor that drives the counter-rotating wheel. Separate frequencies for each wheel can be provided either by adding additional power leads or by superimposing frequencies in a single wheel supply and decoding the frequencies with a miniature chip installed in the wheel housing assembly. Frequency supply and stability can be controlled by standard techniques to accuracies far better than are required for the invention. Also, turning up the scale factor to increase gradiometer sensitivity, when called for, is equivalent to "focusing", a feature which provides an important and valuable capability for the gradiometer to examine more closely a mass of interest.

Another aspect of the invention involves the use of PGA accelerometers based on the same basic principle of the PGA but with oscillating components instead of rotating components. This oscillating analog of the PGA is the Pendulous Oscillating Gyroscope Accelerometer ("POGA"), described in U.S. Pat. No. 5,457,993. The POGA can be designed and operated to have counter-oscillating wheels or other masses (POGA-COW) to provide an adjustable scale factor like the PGA-CRW with rotating wheels. Typically, the adjustable net H would be accomplished by controlling the phase angle between the two oscillating elements (e.g., wheels). A gravity gradiometer with POGA-COW could have a POGA without counter-oscillating wheels measure and compensate for local gravity by providing an input to the POGA-COW torquers. Gravity compensation is required, otherwise the servo-driven member oscillation would be prohibitively high at high scale factors. The operation of the POGA is otherwise unchanged. The gravity-measuring POGA input axis is aligned with the POGA-COW input axes and its output simultaneously feeds the torquer in each POGA-COW. POGA operation may be mechanized in different ways. One way is to modify the components of the conventional PGA such that the rotational elements are oscillated instead of rotated. These changes in design not only simplify the design and construction, but also eliminate the wearout opponents which limit the life of the PGA. Another way is to use Micro Electro Mechanical Systems (MEMS) fabrication methods, which has further advantages of smaller size and lower cost. A compact carouselling gradiometer system can be configured using POGA-COWs as well.

This invention also features a unique "man-portable" gravity gradiometer, which could also be vehicle-mounted. An embodiment of the man-portable gravity gradiometer of the invention contains two PGA-CRW accelerometers, one each mounted at opposite ends of a tube or other elongated carrier, with both input axes aligned in the same direction along the axis of the tube.

The pendulous mass ($m_s$) in the PGA accelerometer is attracted to the mass to be detected ($m_d$). The basic equation for the attraction between two masses is given by:

$$F = G m_s m_d / d^2$$

where:
F=mass attraction force (dynes)
G=gravitational constant=6.67×10e-8 dyne-cm$^2$/gm$^2$
$m_s$=sensing mass (gm)
$m_d$=mass to be detected (gm)
d=distance between masses (cm)

Because the force is applied on the pendulous mass in the PGA accelerometer, a pendulous torque is applied on the torque-summing member in the PGA accelerometer, given by:

$$M = G(m_s l) m_d / d^2$$

where:
M=pendulous torque due to mass attraction (dyne-cm)
$m_s l$=sensing pendulosity (gm-cm)
l=pendulous arm (cm)

The equivalent gravity input to the PGA accelerometer is given by:

$$g_d = M / 980 m_s l = G m_d / (980 d^2)$$

where:
$g_d$=equivalent gravity input due to mass to be detected (g)
980 has units of cm/sec$^2$/g.

This invention features a pendulous gyroscopic accelerometer with variable, controllable scale factor, comprising a pendulous mass, a rotating or oscillating gyroscopic element having an angular momentum, and a system for controlling the angular momentum of the gyroscopic element, to achieve a desired scale factor. The gyroscopic element may comprise counter-rotating wheels. The system for controlling the angular momentum of the gyroscopic element in such case may comprise a system for controlling the rotational speed of one of the counter-rotating wheels. In another embodiment, the gyroscopic element may comprise oscillating wheels. The system for controlling the angular momentum of the gyroscopic element in this embodiment may comprises a system for controlling the phase angle between the oscillating wheels.

The invention also features a gyroscope with variable, controllable scale factor, comprising a rotating or oscillating gyroscopic element having an angular momentum, and a system for controlling the angular momentum of the gyroscopic element, to achieve a desired scale factor. The gyroscopic element may comprise counter-rotating wheels. The system for controlling the angular momentum of the gyroscopic element in such case may comprise a system for controlling the rotational speed of one of the counter-rotating wheels. In another embodiment, the gyroscopic element may comprise oscillating wheels. The system for controlling the angular momentum of the gyroscopic element in this embodiment may comprise a system for controlling the phase angle between the oscillating wheels.

This invention further features a gravity gradiometer comprising a rotating table having a spin axis, and a plurality of pendulous gyroscopic accelerometers mounted to the table, each accelerometer having an input axis and operable to measure an input specific force along the input axis. Preferably, the scale factor of one or more of accelerometers is adjustable. The accelerometers may each comprise a rotating or oscillating gyroscopic element having an angular momentum. In this case, the accelerometers may each further comprise a system for controlling the angular momentum of the gyroscopic element, to achieve the adjustable scale factor. The gyroscopic element may comprise counter-rotating wheels. The system for controlling the angular momentum of the gyroscopic element in such case may comprise a system for controlling the rotational speed of one of the counter-rotating wheels. In another embodiment, the gyroscopic element may comprise oscillating wheels. The system for controlling the angular momentum of the gyroscopic element in this embodiment may comprise a system for controlling the phase angle between the oscillating wheels.

This invention still further features a gravity gradiometer comprising an elongated support structure defining a sense axis, and a plurality of accelerometers mounted to the support structure at spaced locations along the sense axis, each accelerometer having an input axis coaxial with or parallel to the sense axis, and operable to measure an input specific force along the input axis. The accelerometers may comprise pendulous gyroscopic accelerometers. Preferably, the scale factor of one or more of accelerometers is adjustable. The accelerometers may each comprise a rotating or oscillating gyroscopic element having an angular momentum. In this case, the accelerometers may each further comprise a system for controlling the angular momentum of the gyroscopic element, to achieve the adjustable scale factor. The gyroscopic element may comprise counter-rotating wheels. The system for controlling the angular momentum of the gyroscopic element in such case may comprise a system for controlling the rotational speed of one of the counter-rotating wheels. In another embodiment, the gyroscopic element may comprise oscillating wheels. The system for controlling the angular momentum of the gyroscopic element in this embodiment may comprise a system for controlling the phase angle between the oscillating wheels.

BRIEF DESCRIPTION OF THE DRAWINGS

Other objects, features and advantages will occur to those skilled in the art from the following descriptions of the preferred embodiments, and the accompanying drawings, in which.

DESCRIPTION OF THE PREFERRED EMBODIMENTS OF THE INVENTION

Figure 1:
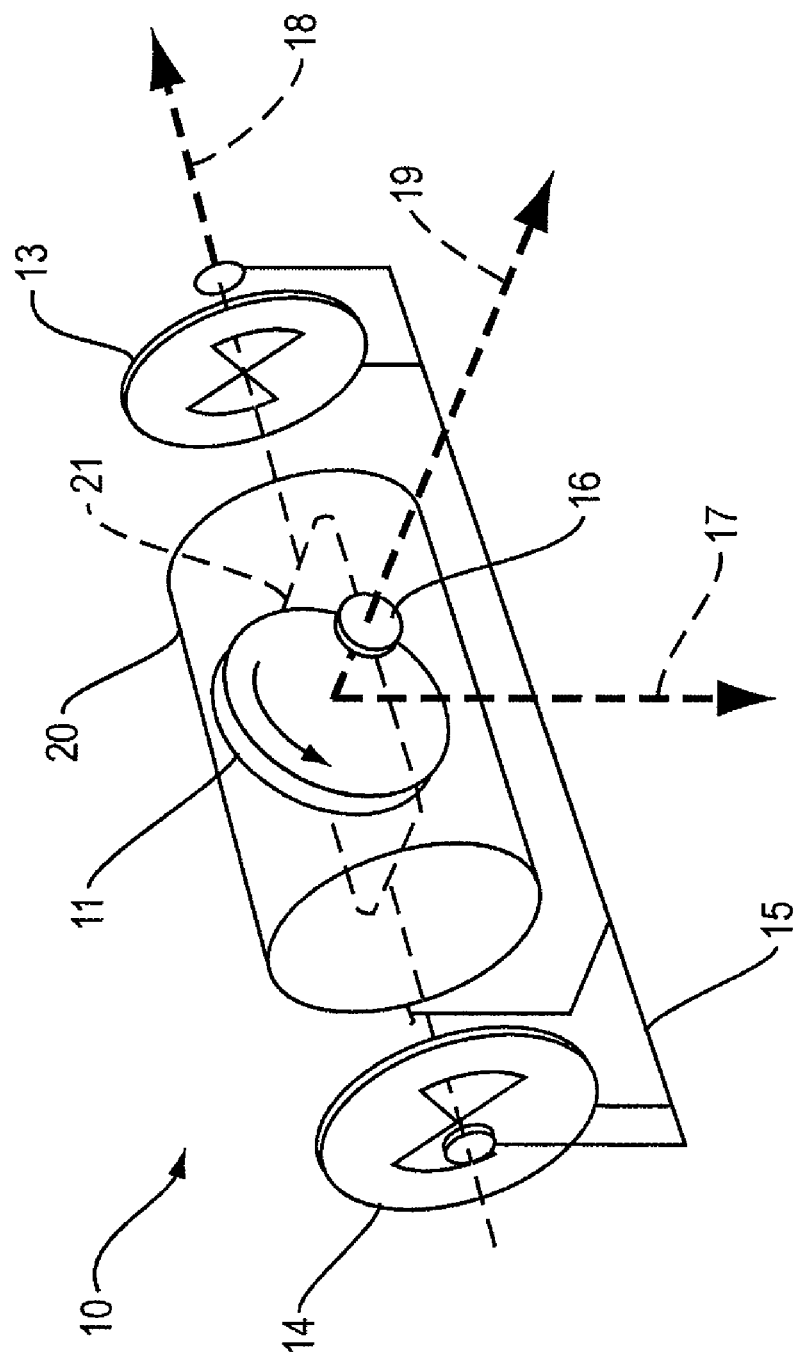
FIG. 1 is schematic diagram of a prior art pendulous gyroscope.
Figure 2:
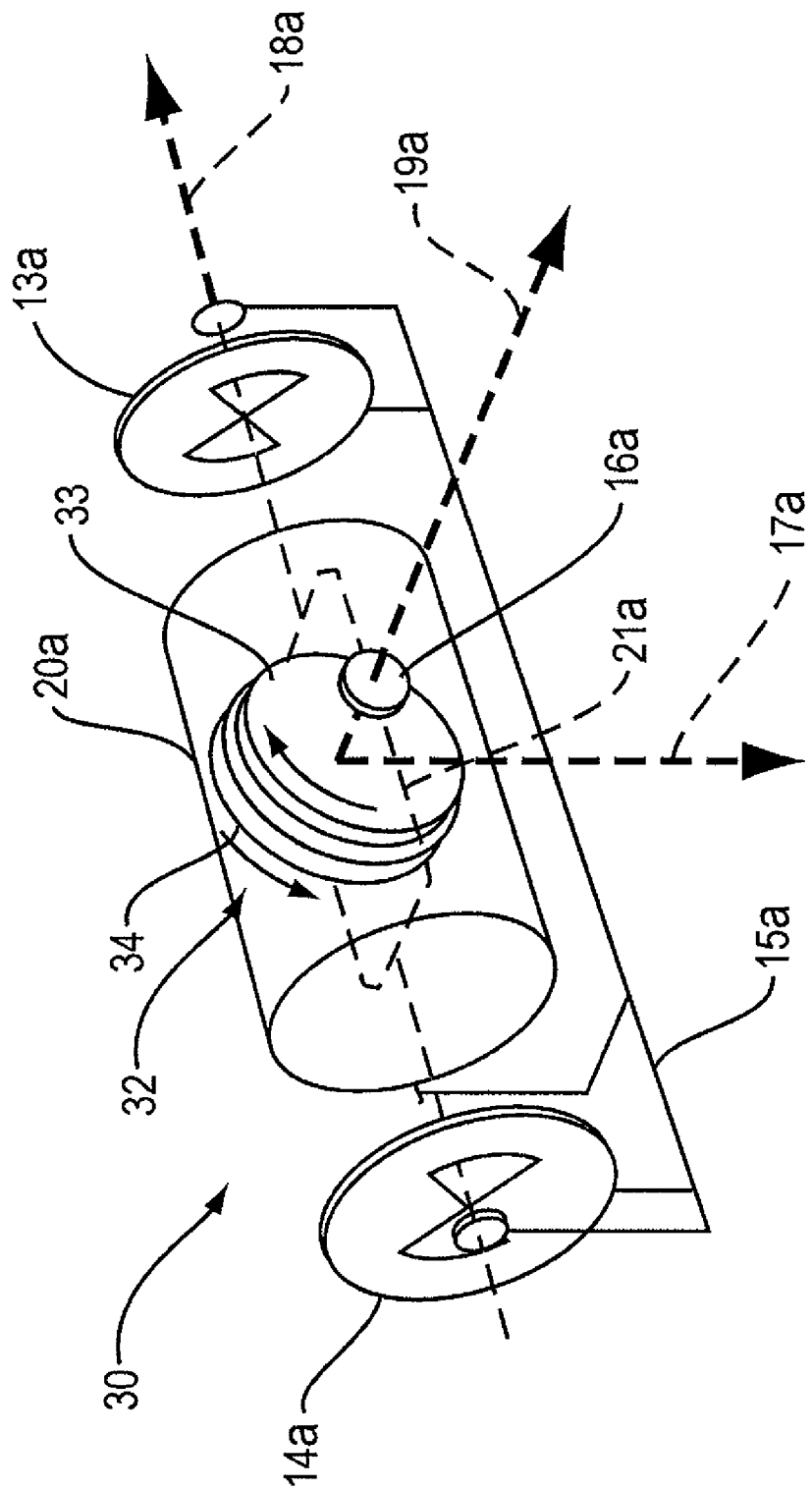
FIG. 2 is a schematic diagram of an embodiment of a pendulous gyroscope with adjustable scale factor according to the invention.

Inventive gyro 30, FIG. 2, accomplishes an adjustable scale factor through fine control of the net angular momentum of rotating gyroscopic element 32, which in the embodiment comprises counter-rotating wheels, but could comprise masses other than wheels, such as annuli. Element 32 is made pendulous by placing an appropriate mass at a fixed distance along the gyro's spin reference axis. Gyro element 32 comprises counter rotating wheels 33 and 34; both wheels 33 and 34 rotate about spin reference axis (SRA) 19a, but in opposite directions. Element 32 is made pendulous through mass 16a that is offset from input axis (IA) 17a and located on SRA 19a. Gimbal 21a, which carries element 32, is rigidly attached to torque-summing member (TSM) 20a. Specific force input applied along the gyro's input axis 17a will produce a pendulous torque about the output axis (OA) 18a. This torque will produce a rotation of TSM 20a about the output axis which is detected by the signal generator (SG) 14a. Torque generator 13a is used to maintain TSM 20a at null during fabrication tests, and is used to produce controlled torque about the output axis 18a. The output from SG 14a is used as the input to an SDM (not shown) that in response rotates TSM 20a about axis 17a to develop gyroscopic torque, which counterbalances the pendulous torque and returns the original offset signal from SG 14a to null. Without the pendulous mass, the device reverts to a standard gyroscope, but with an adjustable angular momentum, which may have advantages, particularly in applications where slew rate is an important factor.

The net angular momentum of element 32 can be controlled by adjustment of the rotational speed of one or both of wheels 33 and 34. Table 1 is an example of the wheel speeds and associated scale factors anticipated in a counter-rotating wheel pendulous gyroscope design such as shown in FIG. 2, in which the speed of wheel 33 is held constant and the speed of wheel 34 is varied. Note that the same result could be accomplished with the two reversed, or by control of the speed of both wheels.

TABLE 1

| Wheel 33 Speed (rpm) | Wheel 34 Speed (rpm) | Scale Factor (rad/sec/g) | Speed Difference (ppm) |
|---|---|---|---|
| 48,000 RPM | 24,000 | 2 | 500,000 (50%) |
| 48,000 RPM | 46,080 | 25 | 40,000 (4%) |
| 48,000 RPM | 47,520 | 1 × 10e2 | 10,000 (1%) |
| 48,000 RPM | 47,952 | 1 × 10e3 | 1,000 |
| 48,000 RPM | 47,995.2 | 1 × 10e4 | 100 |
| 48,000 RPM | 47,999.52 | 1 × 10e5 | 10 |
| 48,000 RPM | 47,9999.952 | 1 × 10e6 | 1 |

Figure 3:
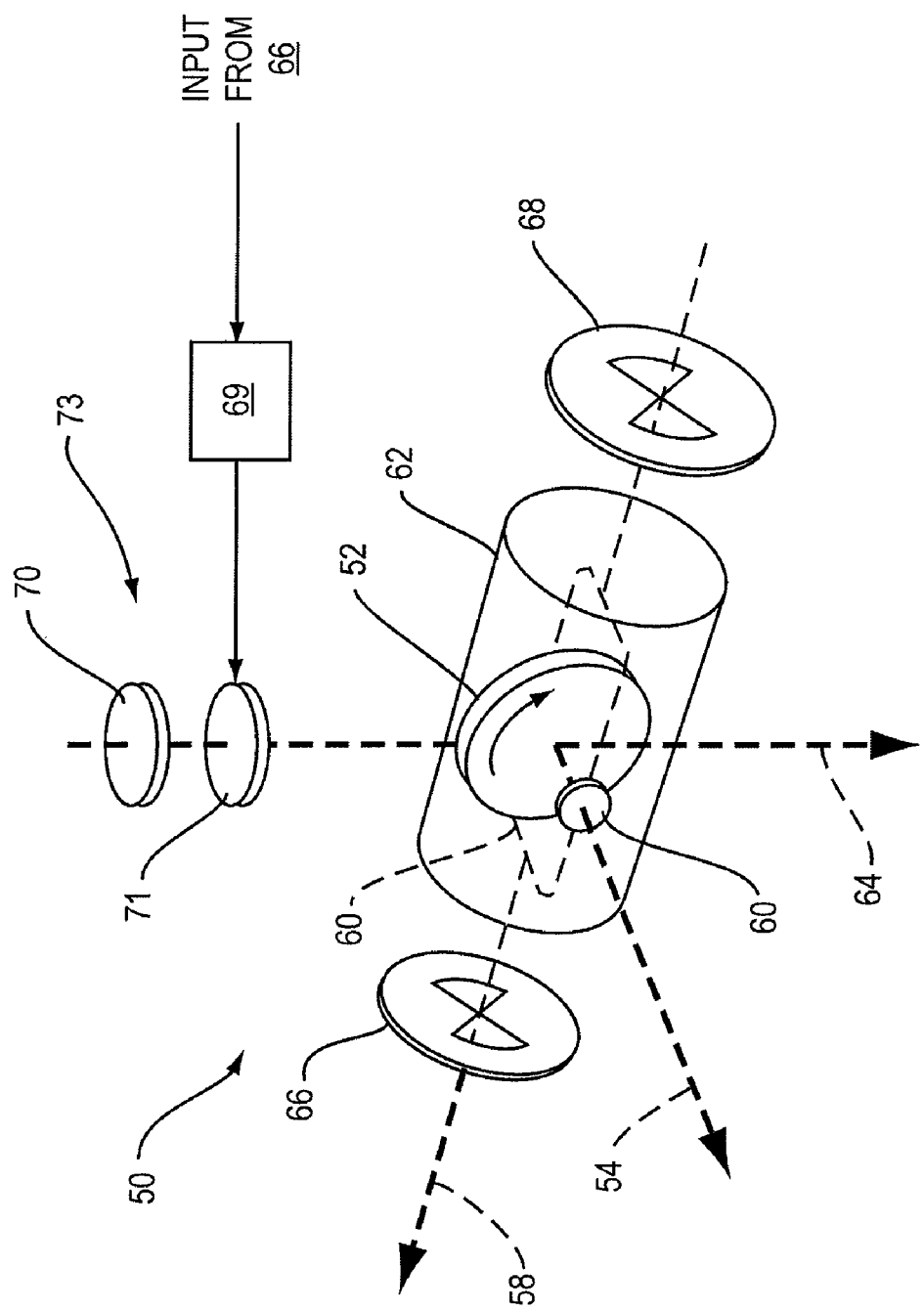
FIG. 3 is a line schematic of a pendulous gyroscopic accelerometer (PGA) of the invention.

FIG. 3 shows a pendulous gyroscopic accelerometer (PGA) that can be used with the invention. Gyroscopic element 52 may comprise a wheel that rotates about spin axis 54. Pendulosity is provided by mass 56 that is offset from output axis 58 and located along spin axis 54. Torque summing member (TSM) 60 carries element 52 and is pivotably mounted to case 62 such that TSM 60 can pivot about axis 58. Case 62 can be rotated about input axis 64. Signal generator 66 detects TSM pivoting about output axis 58, while torque generator 68 can produce controlled torque about output axis 58. SDM 73 includes servo amplifier 69 which has, as its input, the signal from SG 66 and provides control signals to torque motor 71 that causes rotation about axis 64 to develop gyroscopic torque that counter-balances the pendulous torque. Resolver 70 determines the angle, which is the instrument output.

The invention also includes gyroscopes and gyroscopic accelerometers that use oscillating rather than rotating gyroscopic elements. An example of a pendulous oscillating gyroscopic accelerometer (POGA) can be found in U.S. Pat. No. 5,457,993, the disclosure of which is incorporated herein by reference. For the invention, the oscillating gyroscopic element is accomplished with a pair of oscillating wheels or other masses. By controlling the phase angle between the oscillations of such elements, the net angular momentum of the pair can be controlled, thus allowing adjustment of the scale factor.

Figure 4:
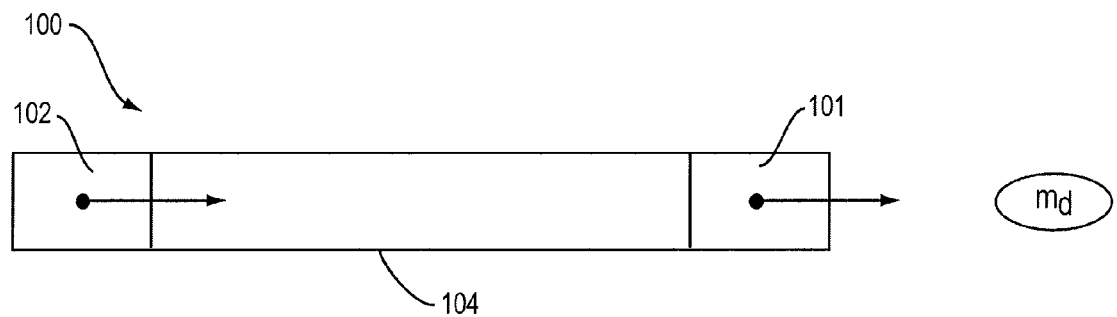
FIG. 4 is a schematic diagram of an embodiment of an in-line gravity gradiometer according to the invention.
Figure 5:
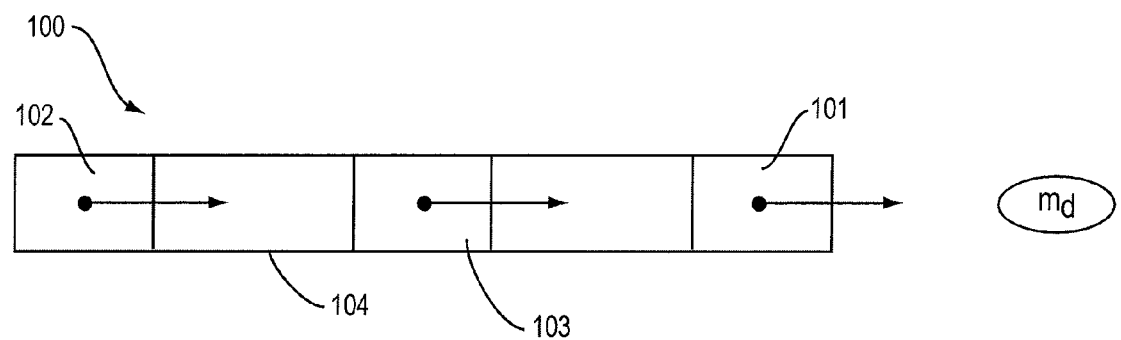
FIG. 5 is a schematic diagram of another embodiment of an in-line gravity gradiometer according to the invention.

Two in-line versions of gravity gradiometers of the invention are shown in FIGS. 4 and 5. Gravity gradiometer 100, FIG. 4, includes aligned accelerometers 101 and 102, oriented such that their sensitive axes (input axes) are aligned along the direction of the longitudinal axis of elongated carrying member 104. Because accelerometer 101 is closer to the mass to be detected ($m_d$) than is accelerometer 102 (by about one meter in a device having a length of about one meter), the output response of accelerometer 101 to the mass will be higher, corresponding to the mass attraction expressed in gravity units. Accelerometer 102 will have the same basic noise and earth gravity input as accelerometer 101, but its signal output due to the mass will be reduced because of its location further from the sensed mass than accelerometer 101. This permits common-mode rejection techniques to be used to reduce the noise and increase the resolution of accelerometer 101, which is the prime sensor responding to the mass to be detected. Because the signal outputs of the two accelerometers are differenced in common-mode rejection techniques, ideally the result is the difference in gravity inputs to the two accelerometers due to the mass to be detected. The difference in gravity inputs across the distance between the two accelerometers constitutes, by definition, the average gravity gradient sensed by the gradiometer system. For example, for accelerometers spaced one meter apart, a 0.1 nano-g difference in gravity inputs to the two accelerometers due to a mass to be detected constitutes a 1 eotvos gravity-gradient input to the gradiometer. In general, as large a spacing between the two accelerometers as is practical is preferred in the gravity gradiometer system in order to maximize the difference in gravity inputs to the two accelerometers due to the mass to be detected.

The levels of mass attraction gravitational force measured by the man-portable gradiometer are small compared to local gravity. Left uncompensated, local gravity inputs may saturate the output of accelerometers 101 and 102 once the scale factor is turned up. It is thus desirable to compensate for local gravity, in order to avoid an overload. This compensation can be made by introducing torquer-compensation into accelerometers 101 and 102 from an additional gravity-compensation accelerometer, whose sole purpose is to provide this compensation. The gravity-compensation accelerometer 103, FIG. 5, is mounted in-line with the other two accelerometers and is located midway between them, as shown in FIG. 5. The signal from the gravity-compensation accelerometer 103 is supplied to the torquers of accelerometers 101 and 102, thus allowing their scale factors to be turned up for higher sensitivity to detect the small gravity input from a mass to be detected. The scale factor of the gravity-compensation accelerometer 103 can be low in comparison to that of the PGA-CRW accelerometers 101 and 102, probably in the range of 10 rad/sec/g, because its sole purpose is to allow the scale factors of the PGA-CRW accelerometers 101 and 102 to be turned up without saturating accelerometer output. The use of a gravity-compensation accelerometer is also applicable to a carouselling system as described below.

Figure 6:
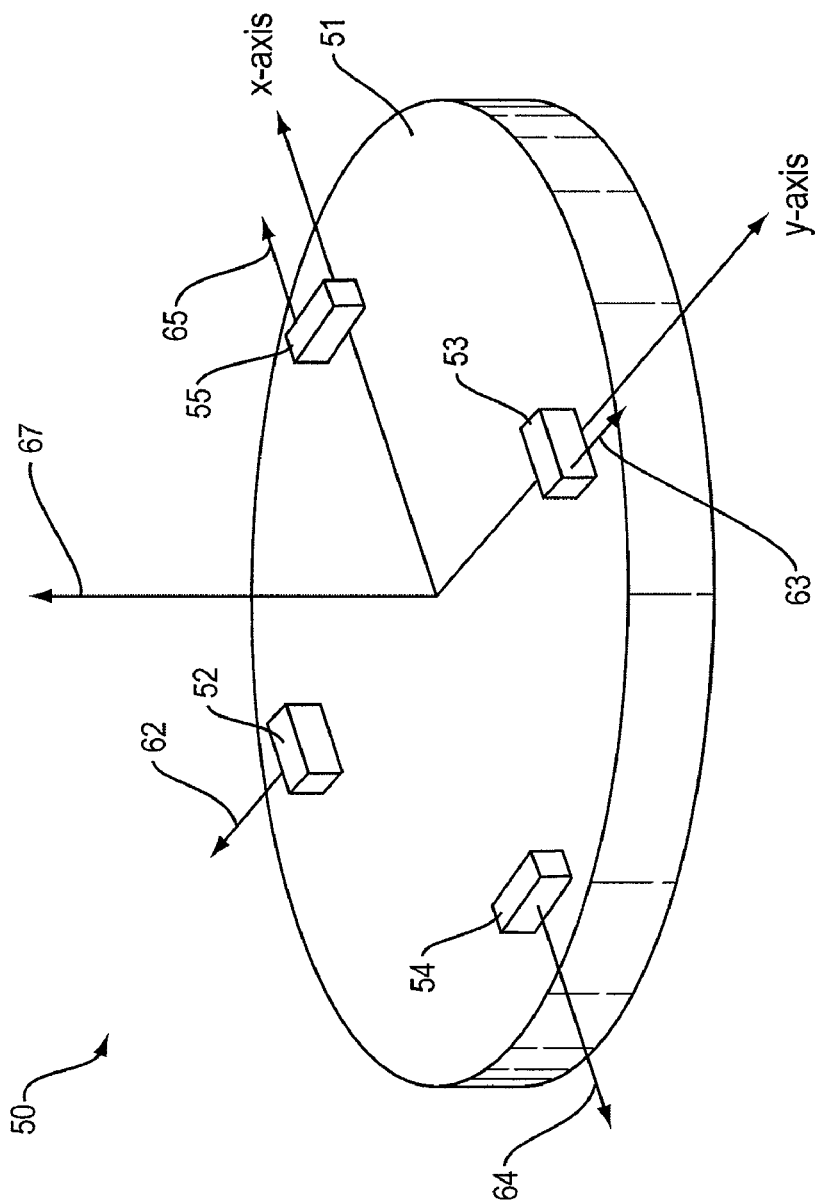
FIG. 6 is a schematic diagram of an embodiment of a spinning table gravity gradiometer according to the invention.

The configuration described above, relative to FIGS. 4 and 5, is meant to be portable and convenient for hand-held use. However, the mechanization demands the best possible performance at the instrument level for accelerometer resolution and sensitivity, and requires the use of advanced noise reduction and compensation techniques. For applications where portability is not required and size is not a major issue, such as stationary mounting or vehicle mounting on a tank, truck, or robot or for airborne vehicles such as airplanes, UAVs, LTAVs, etc., the carouselling system described above could be implemented with PGA-CRWs as shown in FIG. 6. The use of this system should result in much higher overall performance than as with the use of stationary accelerometers. The PGA output rate is variable depending on the level of acceleration input. This variable rate affects the temperature dissipation of the servo-driven member that contains the gyroscope assembly. The gyro assembly is temperature controlled at a precise temperature and, as the rotation rate of the servo-driven member changes, the thermal dissipation also changes and more or less heat from the gyro assembly thermal control system is required to maintain the temperature of the gyro constant. Laboratory testing has identified an error term related to this effect. Standard operation of a PGA, with or without counter-rotating wheels, is with selected angular momentum, so that the angular velocity of the servo-driven member measures the level of acceleration input. The PGA with a CRW may also be operated in a mode in which the servo-driven member is maintained at a fixed angular velocity. The PGA-CRW enables the pendulous gyroscope angular momentum to be varied precisely and quickly. By feeding the output of the pendulous gyro signal generator to a servo around the frequency control of the wheel instead of going to the servo driven member torquer, then the gyroscope signal generator can be returned to null with the change in angular momentum, while there is fixed rotation of the gyroscope. This method of operation would eliminate the thermal error due to variable rotation rate of the servo-driven member, would simplify the PGA-CRW by eliminating the resolver-type readout system and, most importantly, would improve the performance of the PGA-CRW, because the frequency of the wheel voltage for adjustable speed can be measured extremely accurately. A frequency readout should be superior to reading the SDM angle at high scale factor.

FIG. 6 shows gravity gradiometer 50 comprising two pairs of diametrically opposed accelerometers (pairs 52 and 53, and 54 and 55, with input axes 62-65, respectively) that are carried on table 51 that is rotated about carousel axis 67. As described above, the use of PGA-type accelerometers in this configuration dramatically increases the sensitivity of accelerometer 50.

Figure 7:
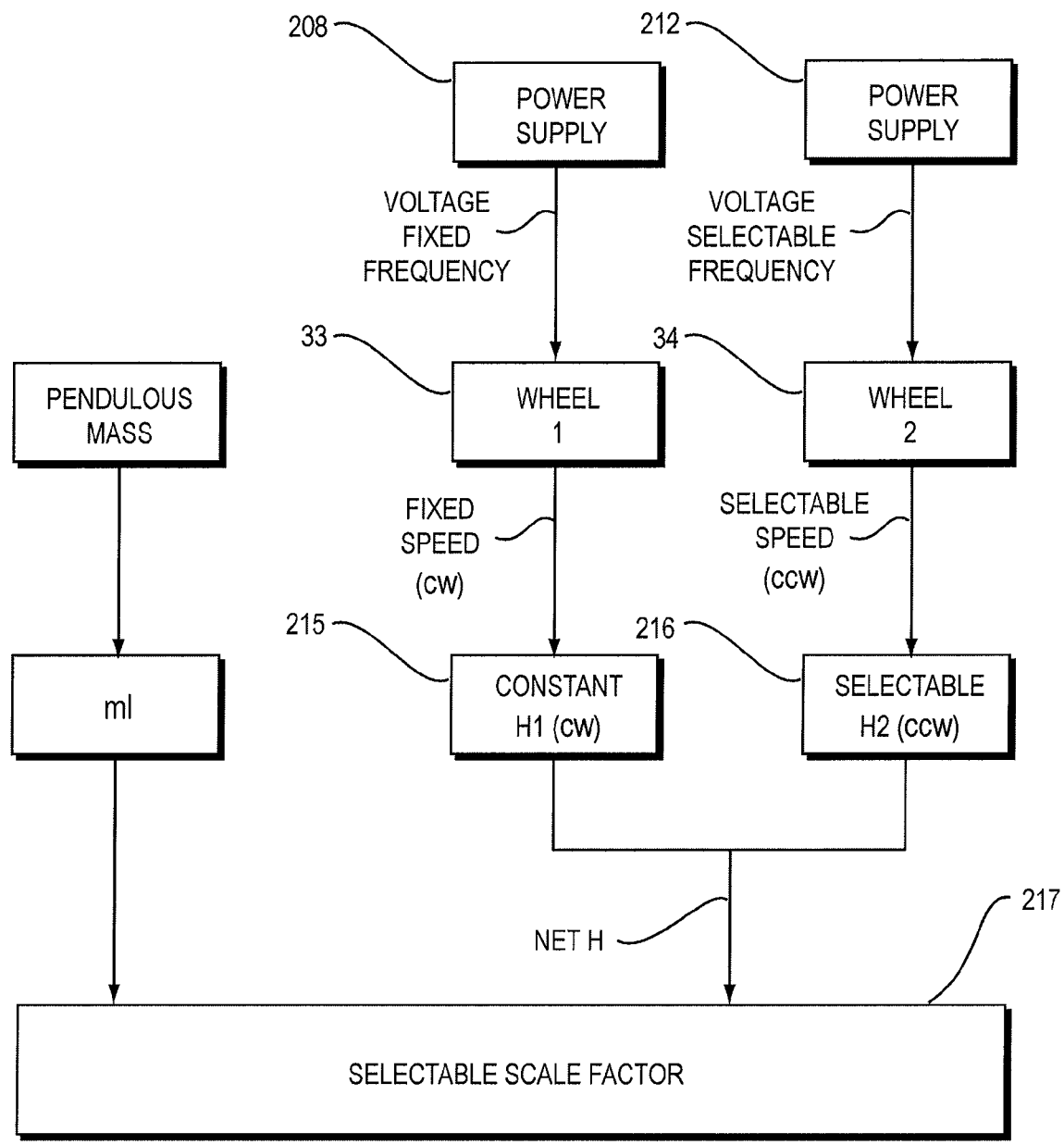
FIG. 7 is a schematic block diagram of a system for controlling the angular momentum of the gyroscopic element for the pendulous gyroscope and PGA of the invention, which can also be used in the gravity gradiometers of FIGS. 4-6.

Control system 200, FIG. 7, may be used to control the rotational speed (or oscillation amplitude) of one or both of rotating (or oscillating) wheels 33 and 34 (the arrows show direction of rotation for illustrative purposes only). Power supplies 208 and 212 provide drive voltages to the motors that spin wheels 33 and 34, respectively; the frequency of the voltage from power supply 212 is selectable. Wheel 33 has a constant speed and thus a constant angular momentum 215. Counter-rotating wheel 34 has an adjustable speed and thus a selectable angular momentum 216. Control of wheel 34 thus controls the net H, leading to a selectable scale factor.

Although specific features of the invention are shown in some drawings and not others, this is not a limitation of the invention, the scope of which is set forth in the following claims.

What is claimed is:

1. A pendulous gyroscopic accelerometer with variable, controllable scale factor, comprising:
   a gyroscopic element having an angular momentum, the gyroscopic element comprising a first member and a second member, the first and second members constructed and arranged to be either rotated in opposite directions or oscillated about a reference axis, such that the gyroscopic element defines an angular momentum;
   a system for controlling either a rotational speed of one or both of the first and second members or a phase angle between the first and second members, to control the angular momentum of the gyroscopic element, to achieve a desired scale factor; and
   a mass located on the reference axis a fixed distance from the gyroscopic element, to accomplish a pendulosity to the gyroscopic element.

2. The pendulous gyroscopic accelerometer of claim 1 in which the first and second members each comprise a rotating wheel, wherein the system for controlling rotates the wheels in opposite directions and controls a rotational speed of one or both of the counter-rotating wheels.

3. The pendulous gyroscopic accelerometer of claim 1 in which the first and second members each comprise an oscillating wheel, wherein the system for controlling oscillates the wheels and controls a phase angle between the oscillating wheels.

4. A gyroscope with variable, controllable scale factor, comprising:
   a gyroscopic element having an angular momentum, the gyroscopic element comprising a first member and a second member, the first and second members constructed and arranged to be either rotated in opposite directions or oscillated about a reference axis, such that the gyroscopic element defines an angular momentum; and
   a system for controlling either a rotational speed of one or both of the first and second members or a phase angle between the first and second members, to control the angular momentum of the gyroscopic element, to achieve a desired scale factor.

5. The gyroscope of claim 4 in which the first and second members each comprise a rotating wheel, wherein the system for controlling rotates the wheels in opposite directions and controls a rotational speed of one or both of the counter-rotating wheels.

6. The gyroscope of claim 4 in which the first and second members each comprise an oscillating wheel, wherein the system for controlling oscillates the wheels and controls a phase angle between the oscillating wheels.

7. A gravity gradiometer, comprising:
   a rotating table having a carousel axis; and
   a plurality of pendulous gyroscopic accelerometers mounted to the table, each accelerometer having an input axis and operable to measure an input specific force along the input axis, wherein a scale factor of one or more of the accelerometers is adjustable;
   wherein the accelerometers with an adjustable scale factor each comprise:
   i) a gyroscopic element having an angular momentum, the gyroscopic element comprising a first member and a second member, the first and second members constructed and arranged to be either rotated in opposite directions or oscillated about a reference axis, such that the gyroscopic element defines an angular momentum;
   ii) a system for controlling either a rotational speed of one or both of the first and second members or a phase angle between the first and second members, to control the angular momentum of the gyroscopic element, to achieve a desired scale factor; and iii) a mass located on the reference axis a fixed distance from the gyroscopic element, to accomplish a pendulosity to the gyroscopic element.

8. The gravity gradiometer of claim 7 in which the first and second members each comprise a rotating wheel, wherein the system for controlling rotates the wheels in opposite directions and controls a rotational speed of one or both of the counter-rotating wheels.

9. The gravity gradiometer of claim 7 in which the first and second members each comprise an oscillating wheel, wherein the system for controlling oscillates the wheels and controls a phase angle between the oscillating wheels.

10. A gravity gradiometer, comprising:
an elongated support structure defining a sense axis; and
a plurality of pendulous gyroscopic accelerometers mounted to the support structure at spaced locations along the sense axis, each accelerometer having an input axis coaxial with or parallel to the sense axis, and operable to measure an input specific force along the input axis, wherein a scale factor of one or more of accelerometers is adjustable;
wherein the accelerometers with an adjustable scale factor each comprise:
i) a gyroscopic element having an angular momentum, the gyroscopic element comprising a first member and a second member, the first and second members constructed and arranged to be either rotated in opposite directions or oscillated about a reference axis, such that the gyroscopic element defines an angular momentum;
ii) a system for controlling either a rotational speed of one or both of the first and second members or a phase angle between the first and second members, to control the angular momentum of the gyroscopic element, to achieve a desired scale factor; and
iii) a mass on the reference axis located a fixed distance from the gyroscopic element, to accomplish a pendulosity to the gyroscopic element.

11. The gravity gradiometer of claim 10 in which the first and second members each comprise a rotating wheel, wherein the system for controlling rotates the wheels in opposite directions and controls a rotational speed of one or both of the counter-rotating wheels.

12. The gravity gradiometer of claim 10 in which the first and second members each comprise an oscillating wheel, wherein the system for controlling oscillates the wheels and controls a phase angle between the oscillating wheels.

* * * * *